US011161564B2

(12) United States Patent
Sawasaki et al.

(10) Patent No.: US 11,161,564 B2
(45) Date of Patent: Nov. 2, 2021

(54) VEHICLE BODY FRAME STRUCTURE OF SADDLE RIDING VEHICLE

(71) Applicant: HONDA MOTOR CO., LTD., Tokyo (JP)

(72) Inventors: Kazuya Sawasaki, Wako (JP); Souichiro Makino, Wako (JP); Hiroshi Okamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 16/508,840

(22) Filed: Jul. 11, 2019

(65) Prior Publication Data
US 2020/0070924 A1 Mar. 5, 2020

(30) Foreign Application Priority Data
Aug. 30, 2018 (JP) .............................. JP2018-161440

(51) Int. Cl.
B62K 11/04 (2006.01)
B62K 19/32 (2006.01)
(52) U.S. Cl.
CPC .............. B62K 11/04 (2013.01); B62K 19/32 (2013.01)
(58) Field of Classification Search
CPC .......... B62K 11/04; B62K 11/02; B62K 19/32
See application file for complete search history.

(56) References Cited

U.S. PATENT DOCUMENTS 4,776,423 A * 10/1988 Buell .................... B62K 11/04
        180/228
7,934,738 B2 * 5/2011 Prielinger .............. B62K 19/06
        280/274
8,408,575 B2 * 4/2013 Kawai .................... B62K 19/10
        280/281.1
8,453,781 B2 * 6/2013 Kawai .................... B62K 11/04
        180/219
8,678,485 B2 * 3/2014 Keisuke ................ B62K 19/20
        296/205

(Continued)

FOREIGN PATENT DOCUMENTS

JP    S61-263881 A    11/1986
JP    11-278346       10/1999

(Continued)

OTHER PUBLICATIONS

German Search Report dated Apr. 17, 2020 with English Translation, 12 pages.

(Continued)

Primary Examiner — Kevin Hurley
Assistant Examiner — Michael R Stabley
(74) Attorney, Agent, or Firm — Rankin, Hill & Clark LLP

(57) ABSTRACT

A vehicle body frame includes a main frame that extends from a head pipe toward the vehicle rear side above an engine and a down-frame that extends downward from one end fixed to the head pipe. The main frame is assembled into a truss shape from a pair of left and right upper frames and a pair of left and right lower frames and reinforcing frames disposed between these upper frames and lower frames. Front end parts of the upper frames are fixed to the upper end side of the head pipe and front end parts of the lower frames are fixed to a part close to the head pipe in the single down-frame.

10 Claims, 7 Drawing Sheets

(56) References Cited

U.S. PATENT DOCUMENTS

| | | | |
|---|---|---|---|
| 9,611,770 B2* | 4/2017 | Tanaka | F01N 13/08 |
| 9,802,667 B2* | 10/2017 | Ishida | B62K 19/20 |
| 9,855,987 B2* | 1/2018 | Ishii | B62K 21/20 |
| 9,957,012 B2* | 5/2018 | Ishii | B62K 11/04 |
| 9,994,286 B2* | 6/2018 | Imai | B62K 11/04 |
| D887,310 S* | 6/2020 | McGinley | D12/117 |
| 2011/0204613 A1* | 8/2011 | Aoki | B62J 35/00 |
| | | | 280/830 |
| 2013/0009378 A1* | 1/2013 | Nagakubo | B60T 8/3685 |
| | | | 280/274 |
| 2014/0305729 A1* | 10/2014 | Testoni | B62K 11/04 |
| | | | 180/220 |
| 2014/0367183 A1* | 12/2014 | Matsuda | B60L 50/66 |
| | | | 180/220 |
| 2015/0136510 A1* | 5/2015 | Naruoka | F02B 61/02 |
| | | | 180/219 |
| 2016/0264205 A1* | 9/2016 | Ishii | B62K 25/283 |
| 2017/0101148 A1* | 4/2017 | Koishikawa | B62K 19/30 |
| 2017/0114708 A1* | 4/2017 | Hamaguchi | F02M 35/048 |
| 2017/0183055 A1* | 6/2017 | Takaya | B62K 11/04 |
| 2018/0229797 A1* | 8/2018 | Makihara | B62H 1/02 |
| 2019/0047654 A1* | 2/2019 | Hasegawa | B62K 25/286 |
| 2019/0217913 A1* | 7/2019 | Yaokawa | B62K 11/04 |

FOREIGN PATENT DOCUMENTS

| | | |
|---|---|---|
| JP | 2008-143511 A | 6/2008 |
| JP | 2012-236467 A | 12/2012 |
| JP | 2017-180328 A | 10/2017 |

OTHER PUBLICATIONS

German Examination Report dated Apr. 17, 2020 with English Translation, 10 pages.

Indian Office Action dated Sep. 14, 2020, 7 pages (includes English text).

Japanese Office Action dated Aug. 25, 2020 with English translation, 7 pages.

Japanese Office Action with English translation dated Mar. 17, 2020, 9 pages.

\* cited by examiner

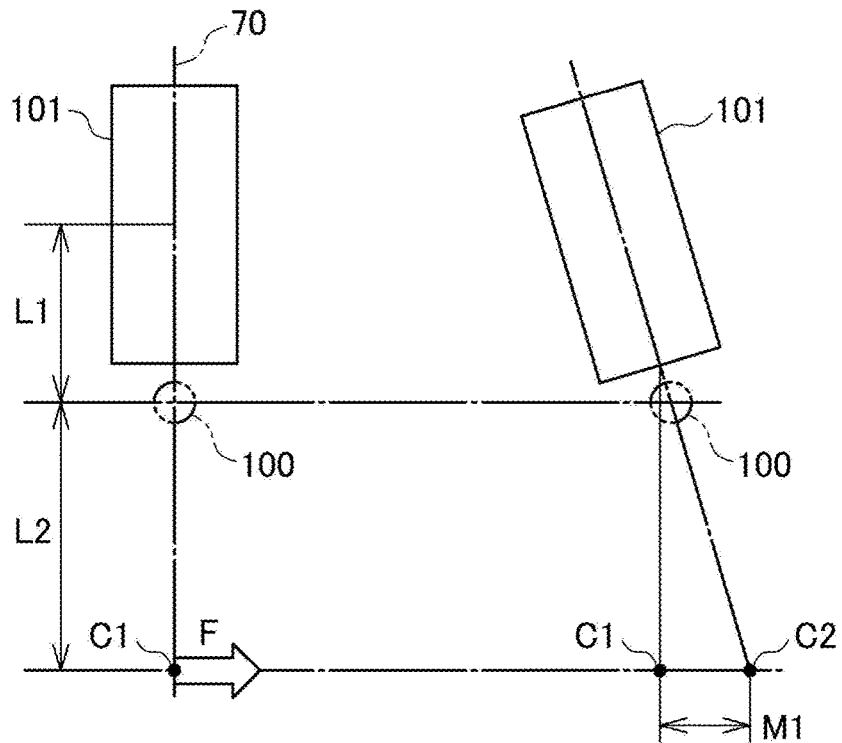
FIG.7A COMPARATIVE EXAMPLE
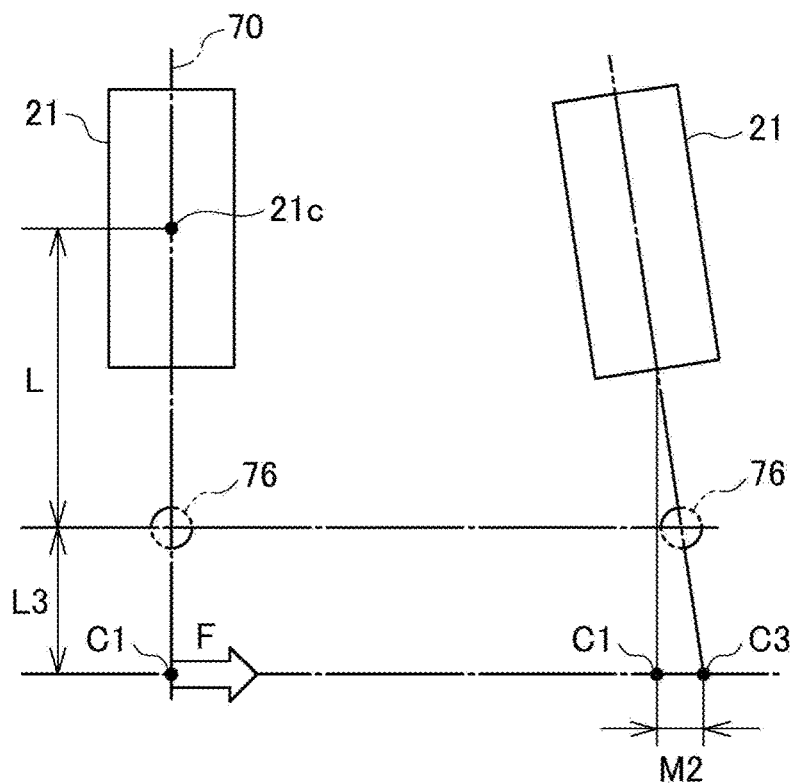
FIG.7B WORKING EXAMPLE

VEHICLE BODY FRAME STRUCTURE OF SADDLE RIDING VEHICLE

INCORPORATION BY REFERENCE

The present application claims priority under 35 U.S.C. § 119 to Japanese Patent Application No. 2018-161440 filed on Aug. 30, 2018. The content of the application is incorporated herein by reference in its entirety.

TECHNICAL FIELD

The present invention relates to a vehicle body frame structure of a saddle riding vehicle.

BACKGROUND ART

Conventionally, a vehicle body frame of a saddle riding vehicle including a truss frame is known (for example, refer to Patent Document 1).

The vehicle body frame includes a head pipe, a pair of left and right upper main pipes and a pair of left and right lower main pipes that each extend rearward from the head pipe, plural reinforcing pipes that connect the upper main pipes and the lower main pipes, a pair of left and right down-pipes that extend rearward from the lower main pipes near the head pipe in such a manner that the rear parts thereof lower, and reinforcing pipes that connect each of the down-pipe and the lower main pipe.

PRIOR ART DOCUMENT

Patent Document

[Patent Document 1]
Japanese Patent Laid-open No. Hei 11-278346

SUMMARY OF THE INVENTION

Problems to be Solved by the Invention

In Patent Document 1, the front end of each of the pairs of left and right upper main pipes and lower main pipes is connected to the head pipe. Therefore, the rigidity of a truss-shaped frame composed of the pairs of left and right upper main pipes and lower main pipes and the plural reinforcing pipes is very high.

Furthermore, the pair of left and right down-pipes are also each connected to the left or right lower main pipe and the reinforcing pipe, and therefore the rigidity is high. As a result, the torsional, center of the vehicle body frame when a torsional load is transmitted from a front wheel to the head pipe and the vehicle body frame is twisted is generated at a high position around the head pipe. For this reason, the distance from the torsional center to the ground-contact point of the front wheel is long and the moment when an external disturbance is applied to the front wheel at the ground-contact point is large. Therefore, there is a problem that the amount of movement of the front wheel at the ground-contact point tends to be large and the steering stability of the vehicle is readily affected.

Moreover, there is also a problem that the weight Increases when the rigidity of the vehicle body frame is set high as described above.

An object of the present invention is to provide a vehicle body frame structure of a saddle riding vehicle that can intend reduction in the weight of the vehicle body frame and improve the steering stability of the vehicle.

Means for Solving the Problems

A vehicle body frame structure of a saddle riding vehicle includes a main frame (22) that extends from a head pipe (21) toward a vehicle rear side above an engine (41) and a down-frame (26) that extends downward from one end fixed to the head pipe (21). The main frame (22) is assembled into a truss shape from a pair of left and right upper frames (31) and a pair of left and right lower frames (32) and reinforcing frames (33, 34, 35, 36) disposed between the upper frames (31) and the lower frames (32). The vehicle body frame structure is characterized in that front ends of the upper frames (31) are fixed to an upper end side of the head pipe (21) and front ends of the lower frames (32) are fixed to a part close to the head pipe (21) in the single down-frame (26).

In the above-described configuration, the vehicle body frame structure may include a sub-frame (27) that couples the down-frame (26) and the lower frame (32), and the sub-frame (27) may be made to abut against the reinforcing frame (34) with an intermediary of the lower frame (32).

Furthermore, in the above-described configuration, an interval between the upper frame (31) and the lower frame (32) may be long on a side of the head pipe (21) and become shorter as going toward the vehicle rear side, Moreover, in the above-described configuration, the sub-frame (27) and the reinforcing frames (33, 34, 35, 36) may be smaller than the upper frames (31) and the lower frames (32) in an outer diameter.

In addition, in the above-described configuration, a plurality of the reinforcing frames (33, 34, 35, 36) may be disposed and, of the plurality of the reinforcing frames (33, 34, 35, 36), the reinforcing frame (34) made to abut against the sub-frame (27) with the intermediary of the lower frame (32) may be larger than the other reinforcing frames (33, 35, 36) in the outer diameter.

Effects of the Invention

In the vehicle body frame structure of a saddle riding vehicle, the front ends of the upper frames are fixed to the upper end side of the head pipe and the front ends of the lower frames are fixed to the part close to the head pipe in the single down-frame. Therefore, due to the connecting of the single down-frame with low rigidity to the head pipe and the truss-shaped main frame with high rigidity, the torsional center of the vehicle body frame when a torsional, load is transmitted from the front wheel to the head pipe and the vehicle body frame is twisted can be lowered. This can improve the steering stability of the vehicle. Furthermore, the volume of the vehicle body frame can be reduced due to the truss-shaped main frame and the single down-frame, so that reduction in the weight of the vehicle body frame can be intended.

In the above-described configuration, the vehicle body frame structure includes the sub-frame that couples the down-frame and the lower frame, and the sub-frame is made to abut against the reinforcing frame with the intermediary of the lower frame. Therefore, due to the abutting of the sub-frame against the reinforcing frame with the intermediary of the lower frame, the vehicle body frame can be given high rigidity and the rigidity of the vehicle body frame can be effectively increased. Furthermore, in the case of coupling the main frame with high rigidity and the down-frame with low rigidity, local difference in the rigidity can be suppressed due to the abutting between the reinforcing frame and the sub-frame. This can cause the vehicle body frame to effectively warp and obtain favorable rigidity balance of the whole of the vehicle body frame.

Furthermore, in the above-described configuration, the interval between the upper frame and the lower frame is long on the side of the head pipe and becomes shorter as going toward the vehicle rear side. Therefore, the rigidity and strength of the front side of the main frame in which torsion occurs can be enhanced. Because the steering system is disposed on the front end side of the main frame, the steering stability of the vehicle can be improved by enhancing the rigidity and strength of the front side of the main frame.

Moreover, in the above-described configuration, the sub-frame and the reinforcing frame are smaller than the upper frames and the lower frames in the outer diameter. Therefore, adjustment of the rigidity of the vehicle body frame can be facilitated due to the coupling of the upper frames and the lower frames with high rigidity and the sub-frame and the reinforcing frame with low rigidity. This can obtain favorable rigidity balance of the whole of the vehicle body frame and cause the vehicle body frame to effectively warp. In addition, ensuring of the strength and reduction in the weight can be intended by the upper frames and the lower frames with a large outer diameter and the sub-frame and the reinforcing frame with a small outer diameter.

In addition, in the above-described configuration, the plural reinforcing frames are disposed. Of the plural reinforcing frames, the reinforcing frame made to abut against the sub-frame with the intermediary of the lower frame is larger than the other reinforcing frames in the outer diameter. Therefore, the strength-and-rigidity balance of the vehicle body frame is adjusted by the reinforcing frame with high rigidity and the other reinforcing frames with low rigidity, so that a favorable strength-and-rigidity balance of the vehicle body frame can be obtained while reduction in the weight of the vehicle body frame is intended.

BRIEF DESCRIPTION OF THE DRAWINGS

FIGS. 7A and 7B illustrate operational diagrams for comparing operations according to the position of the torsional, center of the vehicle body frame: FIG. 7A is an operational diagram illustrating the operation of the vehicle body frame having the torsional center of a comparative example and FIG. 7B is an operational, diagram illustrating the operation of the vehicle body frame having the torsional center of a working example (present embodiment).

MODE FOR CARRYING OUT THE INVENTION

One embodiment of the present invention will be described below with reference to the drawings. In the description, directions such as front, rear, left, right, upper, and lower, represent the directions with respect to the vehicle body unless particularly noted. Furthermore, symbol FR illustrated in the respective diagrams represents the vehicle body front side. In addition, symbol UP represents the vehicle body upper side and symbol LH represents the vehicle body left side.

Figure 1:
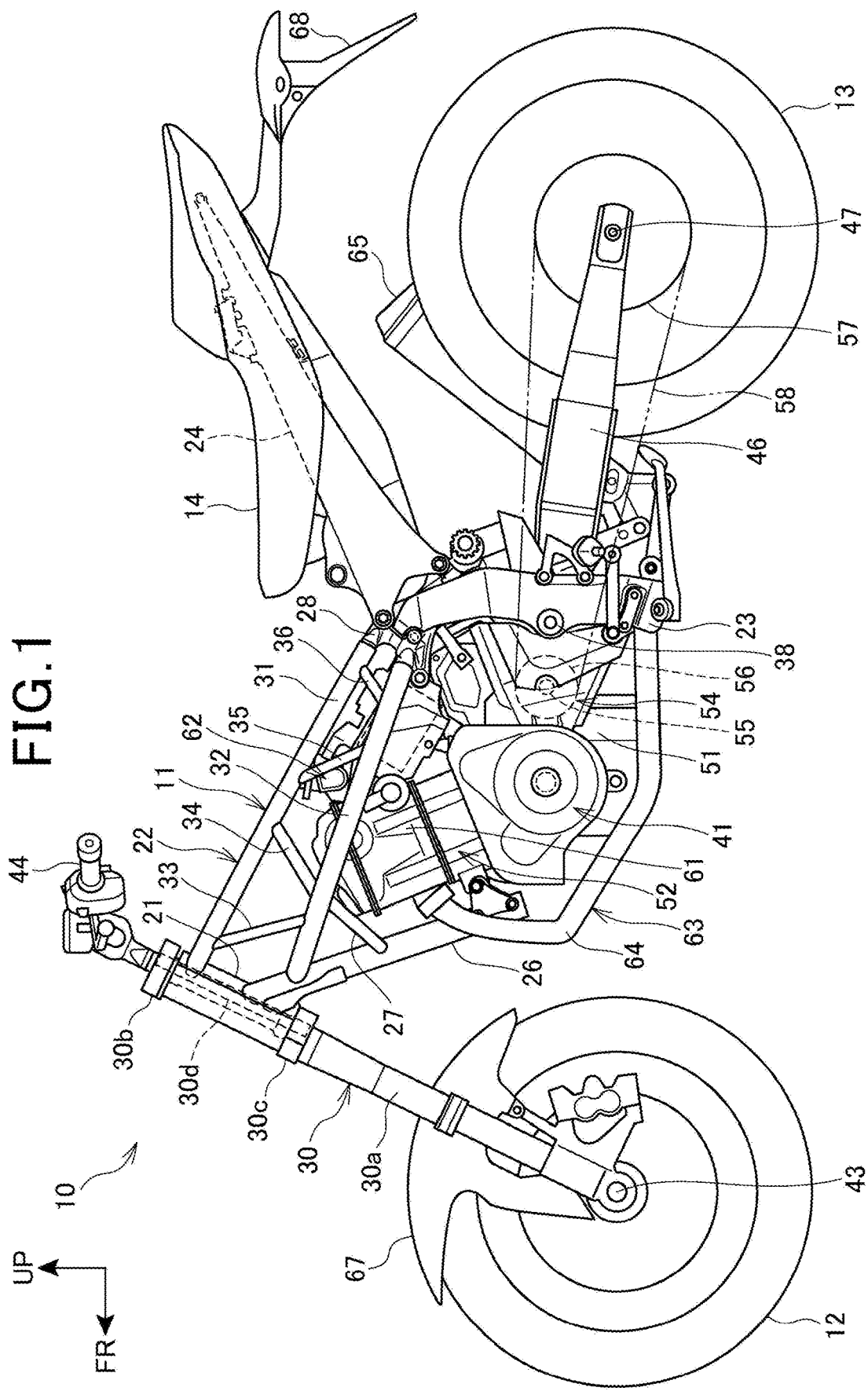
FIG. 1 is a left side view illustrating a motorcycle including a vehicle body frame structure of one embodiment.

FIG. 1 is a left side view Illustrating a motorcycle 10 including a vehicle body frame structure of the one embodiment.

The motorcycle 10 is a saddle riding vehicle including a vehicle body frame 11, a front wheel 12, a rear wheel 13, and a seat 14.

The vehicle body frame 11 includes a head pipe 21, a main frame 22, a pair of left and right pivot frames 23, a pair of left and right seat frames 24, a single down-frame 26, and a pair of left and right sub-frames 27.

The head pipe 21 forms the front end part of the vehicle body frame 11 and steerably supports a front fork 30 that supports the front wheel 12. The main frame 22 is composed of a pair of left and right upper frames 31, a pair of left and right lower frames 32, and each pair of left and right reinforcing frames 33 to 36.

The left and right upper frames 31 extend rearward and obliquely downward from the left and right sides of the upper part of the head pipe 21.

The left and right lower frames 32 extend rearward and obliquely downward from the left and right sides of the upper part of the down-frame 26 and pass below the left and right upper frames 31. The rear end parts of the left and right upper frames 31 and the left and right lower frames 32 are coupled to each other with the intermediary of a rear end connecting member 28.

The reinforcing frames 33 to 36 are connected to the upper frames 31 and the lower frames 32 in an inclined manner and are disposed in such a manner that frames different in the inclination direction are alternately disposed. Thereby, the main frame 22 has a truss structure. By forming the main frame 22 into the truss structure as above, the strength and rigidity of the main frame 22 can be enhanced, and reduction in the weight can be intended.

The left and right pivot frames 23 extend downward from the rear end parts of the left and right main frames 22 and support a pivot shaft 38 that extends in the vehicle width direction.

The left and right seat frames 24 extend rearward and obliquely upward from the left and right sides of the rear end part of the main frame 22 and the left and right sides of the upper end part of the pivot frame 23 and support the seat 14.

The down-frame 26 extends downward (specifically, downward and obliquely rearward) from the lower part of the head pipe 21.

The pivot frame 23 and the down-frame 26 support an engine 41.

The left and right, sub-frames 27 connect the left and right lower frames 32 and the down-frame 26.

The front fork 30 is composed of a pair of left, and right fork pipes 30a, a top bridge 30b, a bottom bridge 30c, and a steering shaft 30d.

The fork pipes 30a are a telescopic shock absorber and the front wheel 12 is supported by the lower end parts of the left and right fork pipes 30a with the intermediary of an axle 43.

The top bridge 30b and the bottom bridge 30c couple the left and right fork pipes 30a. The top bridge 30b is disposed above the bottom bridge 30c separately and a handlebar 44 is attached to the top bridge 30b.

The steering shaft 30d is connected to the top bridge 30b and the bottom bridge 30c in the upward-downward direction and is inserted in the head pipe 21 to be pivotally supported.

A swingarm 46 is supported by the pivot shaft 38 swingably in the upward-downward direction and the rear wheel 13 is supported by the rear end part of the swingarm 46 with the intermediary of an axle 47.

The engine 41 has a crankcase 51 in which a crankshaft is housed and a cylinder unit 52 that protrudes from the upper part of the front part of the crankcase 51. A transmission 54 is disposed at the rear part of the crankcase 51. The transmission 54 has an output shaft 55, and a chain 58 is stretched on a drive sprocket 56 attached to the output shaft 55 and a driven sprocket 57 disposed integrally with the rear wheel 13.

The cylinder unit 52 includes a cylinder head 61. An intake system 62 is connected to the rear part of the cylinder head 61 and an exhaust system 63 is connected to the front part of the cylinder head 61. The exhaust system 63 includes an exhaust pipe 64 that extends from the cylinder head 61 toward the vehicle front side and the vehicle rear side and a muffler 65 connected to the rear end part of the exhaust pipe 64.

The front wheel 12 is covered from the upper side by a front fender 67 attached to the front fork 30 and the rear wheel 13 is covered from the upper side by a rear fender 68 attached to the left and right, seat frames 24.

Figure 2:
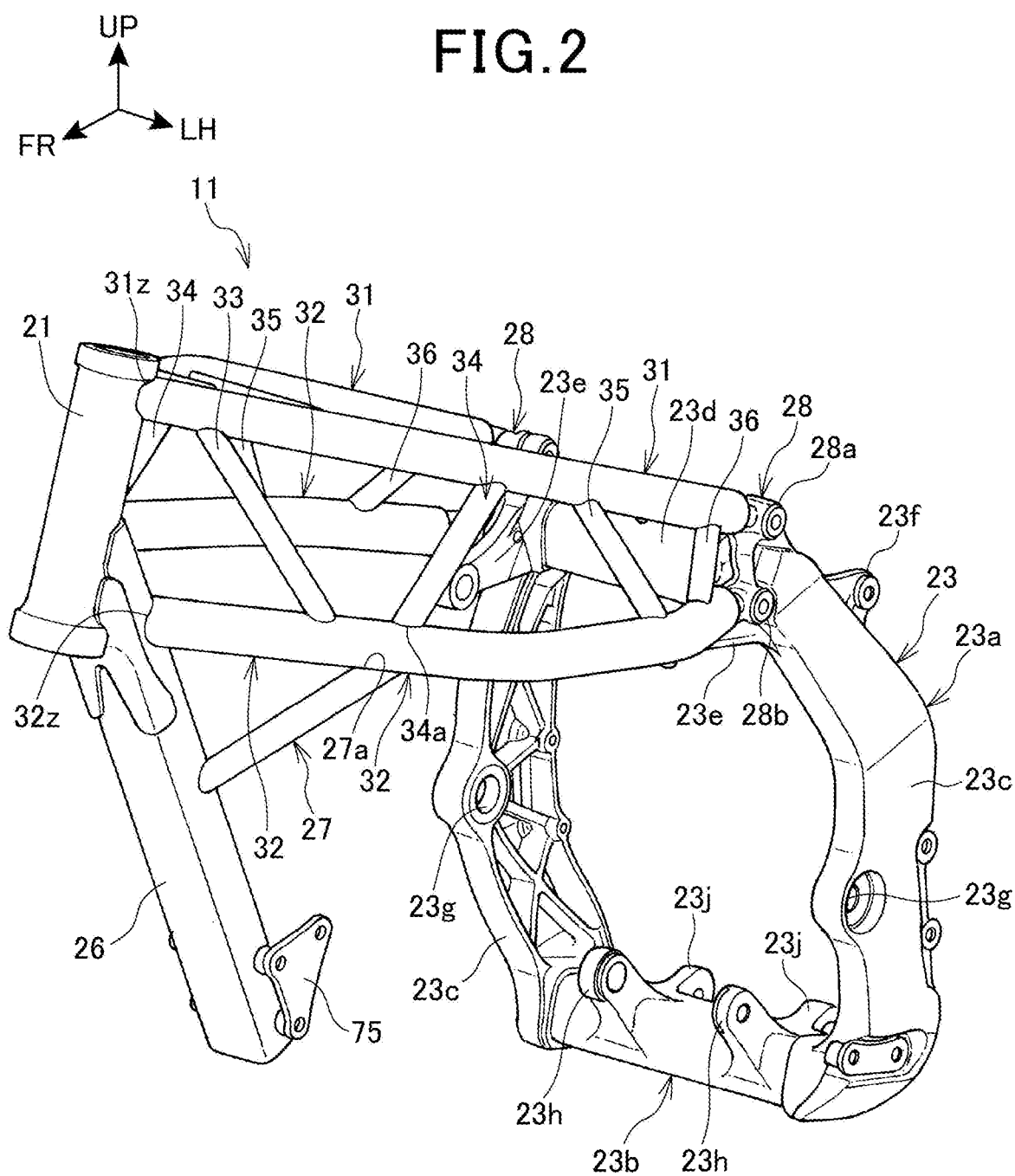
FIG. 2 is a perspective view illustrating a vehicle body frame.
Figure 3:
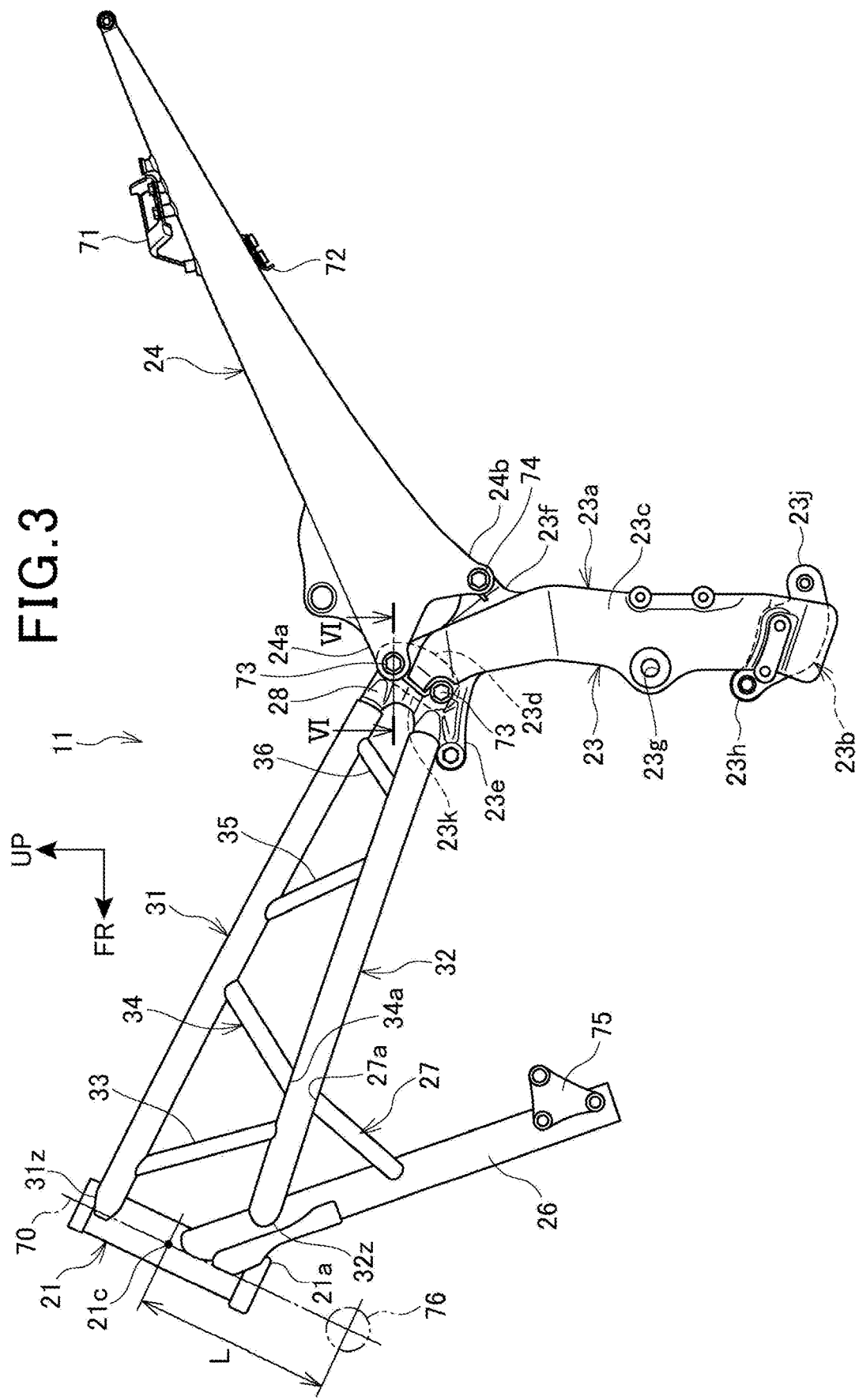
FIG. 3 is a left side view illustrating the vehicle body frame.

FIG. 2 is a perspective view illustrating the vehicle body frame 11. FIG. 3 is a left side view illustrating the vehicle body frame 11.

As illustrated in FIG. 2 and FIG. 3, front end parts 31z of the left and right upper frames 31 are joined to the upper part of the head pipe 21 by welding and front end parts 32z of the left and right lower frames 32 are joined to the upper part of the down-frame 26 by welding.

The rear end parts of the left and right upper frames 31 and the left and right lower frames 32 are connected to each other with the intermediary of the rear end connecting member 28.

The rear end connecting member 28 includes an upper attaching part 28a to which the upper end part of the pivot frame 23 and the front end part of the seat frame 24 are attached by co-fastening and a lower attaching part 28b to which only the upper end part of the pivot frame 23 is attached.

In side view of the vehicle body frame 11, the interval between the upper frame 31 and the lower frame 32 is long on the side of the head pipe 21 and is short on the side of the rear end connecting member 28. The rigidity and strength of the front side of the main frame 22 can be enhanced by gradually decreasing the interval between the upper frame 31 and the lower frame 32 as going from the head pipe 21 toward the rear side as above. Furthermore, it is possible to enhance the torsional rigidity of the main frame 22 when a torsional load acts on the main frame 22 from the side of the head pipe 21.

The left and right upper frames 31, the left and right lower frames 32, and the reinforcing frames 33 to 36 of the main frame 22 are all steel pipes. However, the material is not limited to steel.

The pivot frame 23 is made by aluminum alloy die-casting and is composed of an upper frame part 23a and a lower cross-frame part 23b that connects the lower end parts of the upper frame part 23a. The material of the pivot frame 23 is not limited to the aluminum alloy.

The upper frame part 23a is monolithically formed from a pair of left and right pivot plate parts 23c and an upper cross part 23d that connects the upper end parts of the left and right pivot, plate parts 23c.

The left and right pivot plate parts 23c have a pair of left and right pivot-side engine support parts 23e, a pair of left and right rear attaching parts 23f, and a pair of left and right pivot shaft insertion holes 23g.

The upper cross part 23d extends in the vehicle width direction and connects the upper end parts of the left and right pivot plate parts 23c to each other monolithically.

The left and right pivot-side engine support parts 23e are parts that monolithically protrude from the upper parts of the left and right pivot plate parts 23c, respectively, toward the vehicle front side and support the upper part of the rear part of the crankcase 51 (see FIG. 1) of the engine 41 (see FIG. 1).

The left and right, rear attaching parts 23f are parts that monolithically protrude from the upper parts of the left and right pivot plate parts 23c, respectively, toward the vehicle rear side and are parts to which the front end parts of the left and right seat frames 24 (specifically, front lower attaching part 24b) are attached.

The left and right pivot shaft insertion holes 23g are parts in which the pivot shaft 38 (see FIG. 1) is inserted.

The lower cross-frame part 23b is fastened to each of the lower end parts of the left and right pivot plate parts 23c by plural bolts and monolithically includes a pair of left and right forward protruding parts 23h that protrude toward the front side and a pair of left and right rearward protruding parts 23j that protrude toward the rear side.

The left and right forward protruding parts 23h support the lower part of the rear part of the crankcase 51 of the engine 41.

The left and right rearward protruding parts 23j are parts to which a link system that supports the lower end part of a rear cushion unit is coupled. The upper end part of the rear cushion unit is attached to the upper cross part 23d of the pivot frame 23, and the lower end part is attached to the left and right rearward protruding parts 23j with the intermediary of the link system. Part of the link system is coupled to the swingarm 46 (see FIG. 1).

The rear end parts of the left and right seat frames 24 are fastened to each other by a fastening member. In addition, the rear parts thereof are connected to each other by two cross plates 71 and 72 that extend in the vehicle width direction.

At the front end part of each of the left and right seat frames 24, a front upper attaching part 24a on the upper side and the front lower attaching part 24b on the lower side are monolithically formed.

The front upper attaching part 24a is co-fastened to the upper attaching part 28a of the rear end connecting member 28 and an upper end part 23k of the pivot plate part 23c by a bolt 73. Furthermore, the lower attaching part. 28b of the rear end connecting member 28 is attached to the upper end part 23k of the pivot plate part 23c by the bolt 73.

The front lower attaching part 24b is attached to the rear attaching part 23f of the pivot plate part 23c by a bolt 74.

The down-frame 26 is made of a steel pipe and the front end parts 32z of the left and right lower frames 32 are each connected to a part close to the head pipe 21 in the upper part of the down-frame 26 (specifically, part separated rearward from a lower end 21a of the head pipe 21).

A pair of left and right engine hangers 75 are attached to the lower end part of the down-frame 26. The front part of the cylinder unit 52 (see FIG. 1) of the engine 41 (see FIG. 1) is supported by the left and right engine hangers 75.

The left and right sub-frames 27 are made of steel pipes. An upper end part 27a of the sub-frame 27 (connected part to the lower frame 32) is a part opposed to a lower end part 34a of the reinforcing frame 34 (connected part to the lower frame 32). That is, the sub-frame 27 is made to abut against the reinforcing frame 34 with the intermediary of the lower frame 32.

The upper frames 31 and the lower frames 32 are larger than the sub-frames 27 and the reinforcing frames 33 to 36 in the outer diameter. The lower frames 32 are larger than the upper frames 31 in the outer diameter. Of the reinforcing frames 33 to 36, the reinforcing frames 34 are larger than the other reinforcing frames 33, 35, and 36 in the outer diameter. Furthermore, the outer diameter is equal or substantially equal between the sub-frames 27 and the reinforcing frames 34.

By setting the outer diameter of the upper frames 31 and the lower frames 32 larger and setting the outer diameter of the sub-frames 27 and the reinforcing frames 33 to 36 smaller as above, the strength and rigidity of the vehicle body frame 11 can be enhanced and increase in the weight of the vehicle body frame 11 can be suppressed.

Furthermore, the strength and rigidity of the vehicle body frame 11 can be effectively enhanced by setting the outer diameter of the reinforcing frames 34 larger than that of the other reinforcing frames 33, 35, and 36 and causing the sub-frames 27 and the reinforcing frames 34 to have an equal or substantially equal outer diameter.

In FIG. 3, below the head pipe 21, a torsional center 76 of the vehicle body frame 11 when a torsional load acts on the vehicle body frame 11 from the front wheel 12 (see FIG. 1) through the front fork 30 exists. The torsional center 76 is located on an axis line 70 of the steering shaft 30d (see FIG. 1) supported by the head pipe 21.

The torsional center 76 is the center of torsion around an axis that extends in the vehicle front-rear direction.

The distance from a center 21c of the whole length of the head pipe 21 (center on the axis line 70) to the torsional center 76 is defined as L. The distance L is longer compared with the conventional vehicle body frame that does not have the combination of the main frame 22 with the truss structure, the down-frame 26, and the sub-frames 27 as in the present embodiment. That is, the torsional, center 76 is located on the lower side relative to that in the conventional vehicle body frame.

Figure 4:
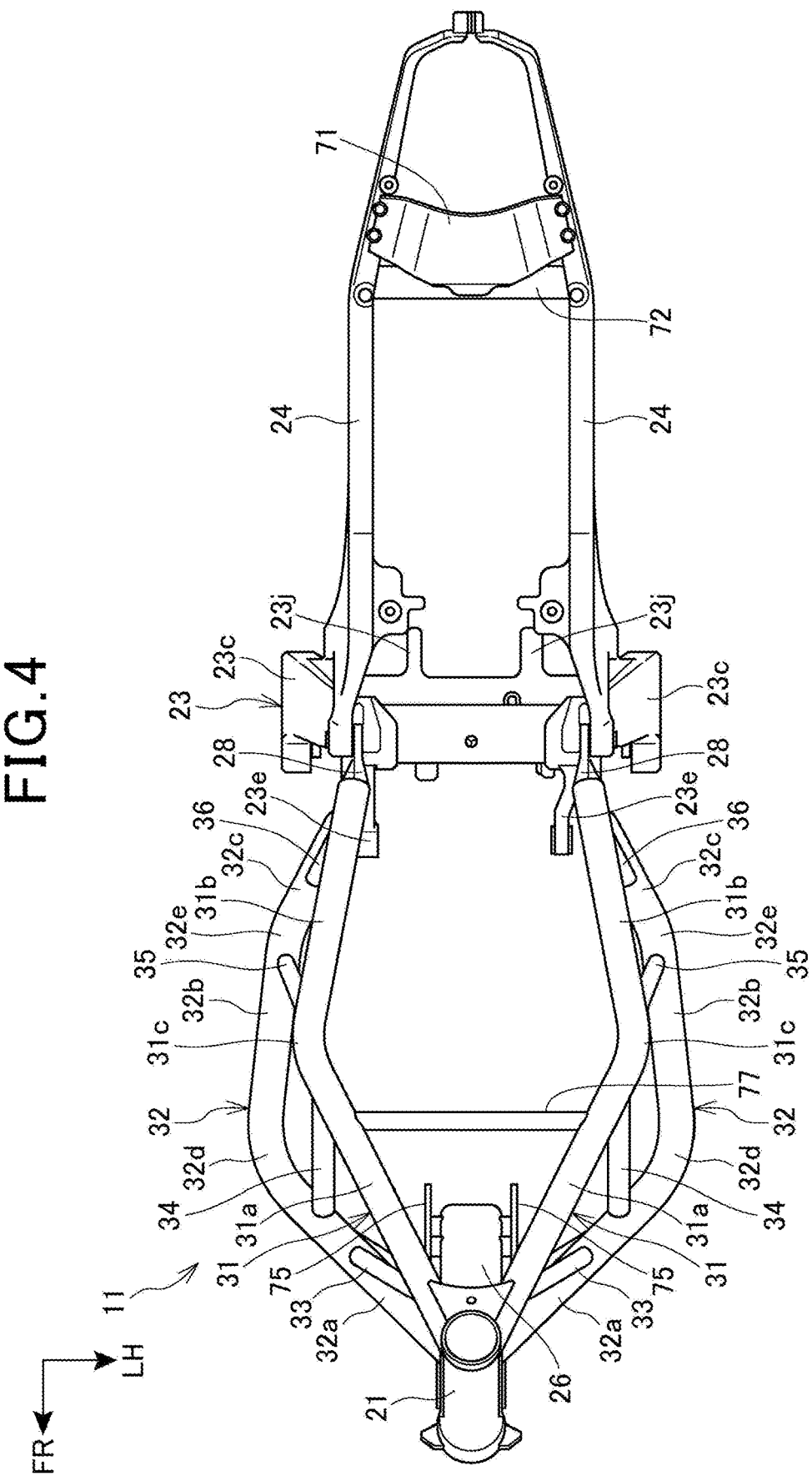
FIG. 4 is a plan view illustrating the vehicle body frame.

FIG. 4 is a plan view illustrating the vehicle body frame 11.

The left and right upper frames 31 each include a front inclined part 31a that extends outward in the vehicle width direction and obliquely rearward from the head pipe 21 and a rear inclined part 31b that extends inward in the vehicle width direction and obliquely rearward from the rear end of the front inclined part 31a. The rear end connecting member 28 is connected to the rear, end parts of the rear inclined parts 31b.

The front inclined part 31a and the rear inclined part 31b bend at a bending part 31c.

A cross frame 77 that extends in the vehicle width direction is stretched between the left and right front inclined parts 31a.

The left and right lower frames 32 each include a front inclined part 32a, a middle inclined part 32b, and a rear inclined part 32c. The rear end connecting member 28 is connected to the rear end parts of the rear inclined parts 32c.

The front inclined part 32a extends outward in the vehicle width direction and obliquely rearward from the down-frame 26. The middle inclined part 32b extends inward in the vehicle width direction and obliquely rearward from the rear end of the front inclined part 32a. The rear inclined part 32c extends inward in the vehicle width direction and obliquely rearward from the rear end of the middle inclined part 32b.

The front inclined part 32a and the middle inclined part 32b bend at a bending part 32d and the middle inclined part 32b and the rear inclined part 32c bend at a bending part 32e.

The front inclined part 32a, the middle inclined part 32b, and the rear inclined part 32c all protrude to the outside in the vehicle width direction relative to the upper frame 31 in plan view. Due to this, the space between the left and right lower frames 32 can be ensured as a space wider than the space between the left and right upper frames 31.

Furthermore, the left and right lower frames 32 protrude to the outside in the vehicle width direction relative to the left and right pivot frames 23.

The reinforcing frames 33 and 34 are stretched between the front inclined part 31a of the upper frame 31 and the front inclined part 32a of the lower frame 32. The reinforcing frames 35 are stretched between the rear inclined part 31b of the upper frame 31 and the middle inclined part 32b of the lower frame 32. The reinforcing frames 36 are stretched between the rear inclined part 31b of the upper frame 31 and the rear inclined part 32c of the lower frame 32.

The front end parts (fastening parts) of the left and right pivot-side engine support parts 23e of the pivot frame 23 are located inside in the vehicle width direction relative to the rear inclined parts 31b of the left and right upper frames 31.

The rear parts of the left and right seat frames 24 are sandwiched by the two cross plates 71 and 72 in the upward-downward direction. This can enhance the strength and rigidity of the left and right seat frames 24.

Figure 5:
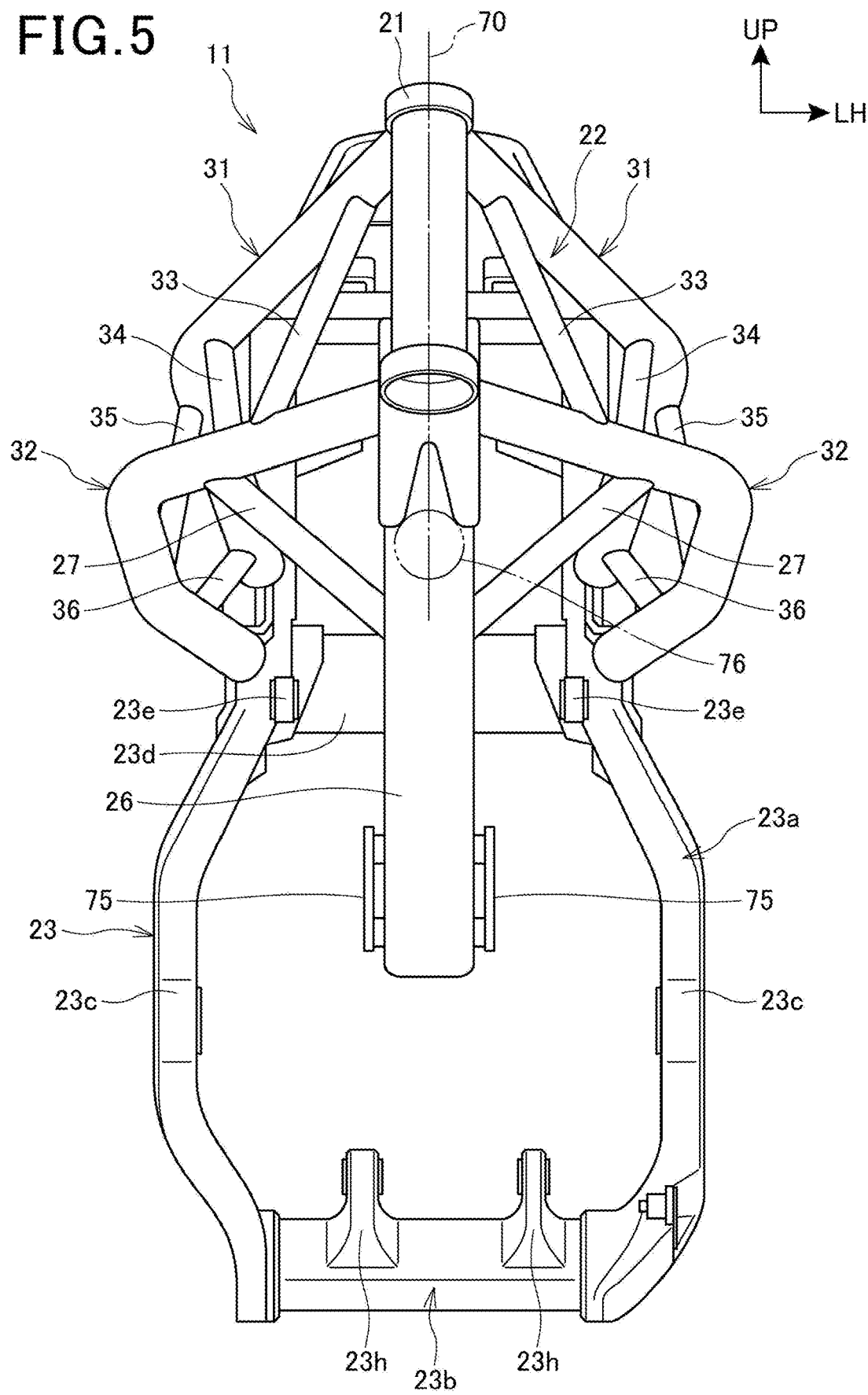
FIG. 5 is a front view illustrating the vehicle body frame.

FIG. 5 is a front view illustrating the vehicle body frame 11.

The left and right lower frames 32 greatly protrude to the outside in the vehicle width direction relative to the left and right upper frames 31 and are supported from the upper and lower sides by the left and right reinforcing frames 34 attached to the left and right upper frames 31 and the left and right sub-frames 27 attached to the down-frame 26.

In particular, the left and right reinforcing frames 34 and the left and right sub-frames 27 are made to abut against the same positions on the left and right lower frames 32 in such a manner that the lower frames 32 are sandwiched from the upper and lower sides, and are welded. For this reason, the deflection of the left and right lower frames 32 in the upward-downward direction is suppressed and the strength and rigidity as the whole of the main frame 22 can be enhanced with suppression of increase in the weight.

The torsional center 76 overlaps with the down-frame 26 in front view and the vehicle body frame 11 is twisted around an axis that passes through the torsional center 76 and extends in the front-rear direction.

The vehicle body frame 11 of the present embodiment has the following characteristics (1) to (3).

(1) Because the main frame 22 has the truss structure, the rigidity of the appropriate main frame 22 having flexibility without becoming excessively large is obtained.

(2) Because the down-frame 26 is a single frame and a lower frame that connects the down-frame 26 and the pivot frame 23 is done away with, the vehicle body frame 11 on the side of the down-frame 26 is caused to have lower rigidity than in the conventional vehicle body frame and the flexibility thereof is increased.

(3) By connecting the lower part of the main frame 22 (left and right lower frames 32) to the down-frame 26, increase in the rigidity of the lower part of the main frame 22 is suppressed.

Due to the above (1) to (3), the rigidity of the side of the down-frame 26 can be set lower, and deformation thereof can be carried out more easily than in the conventional vehicle body frame. This can lower the torsional center 76 of the vehicle body frame 11.

By lowering the position of the torsional center 76 relative to that in the conventional vehicle body frame as above, the steering stability of the vehicle can be improved.

Figure 6:
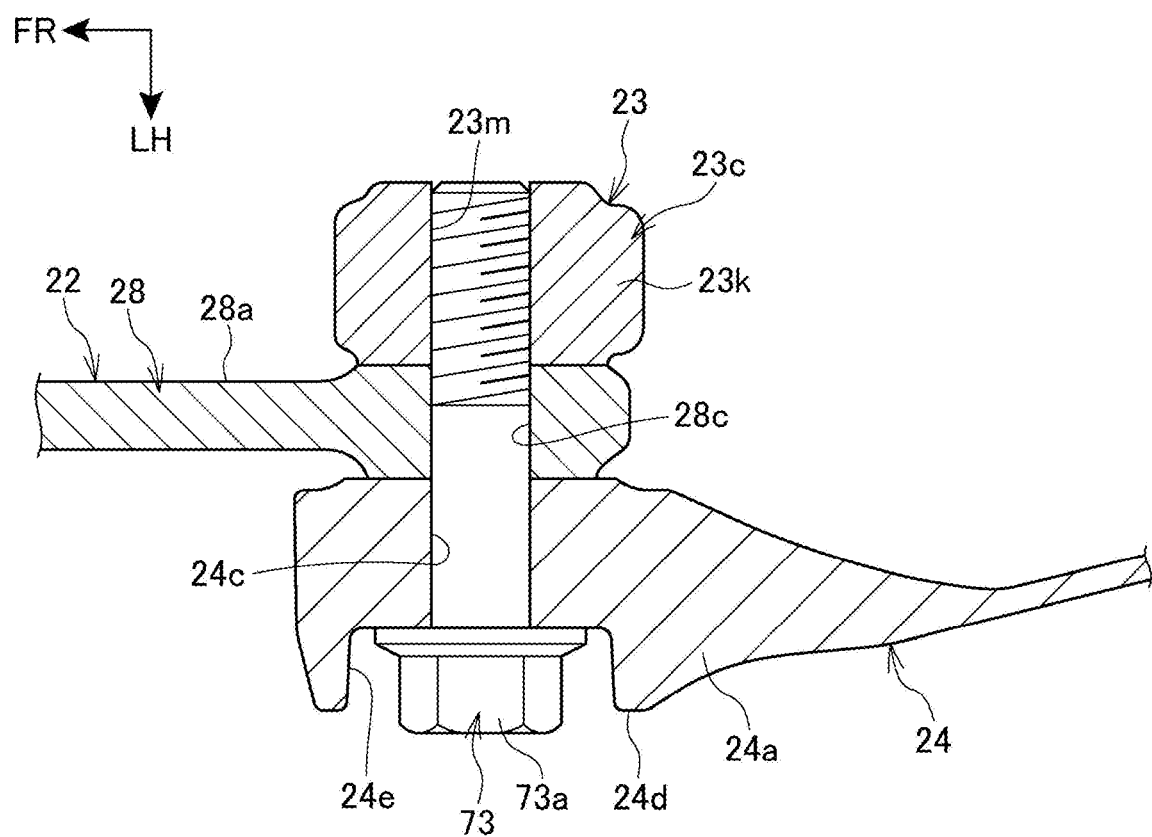
FIG. 6 is a sectional view along line VI-VI in FIG. 3.

FIG. 6 is a sectional view along line VI-VI in FIG. 3.

The upper end part of the pivot frame 23 (specifically, upper end part 23k of the pivot plate part 23c), the upper attaching part 28a of the rear end connecting member 28 of the main frame 22, and the front upper attaching part 24a of the seat frame 24 are overlapped sequentially from the inside in the vehicle width direction to the outside in the vehicle width direction.

A bolt insertion hole 24c is opened in the front upper attaching part 24a of the seat frame 24. A bolt insertion hole 28c is opened in the upper attaching part 28a of the main frame 22. A screw hole 23m is formed in the upper end part 23k of the pivot frame 23. The bolt 73 is made to pass through these bolt insertion hole 24c and bolt insertion hole 28c, and the tip part of the bolt 73 is screwed into the screw hole 23m.

A recess 24e is formed in a side surface 24d of the front upper attaching part 24a of the seat frame 24 and a head 73a of the bolt 73 is disposed in the recess 24e. The recess 24e is shaped by a mold when the seat frame 24 is manufactured by a die-casting method. By forming the recess 24e as above, the amount of protrusion of the head 73a of the bolt 73 from the side surface 24d can be suppressed. Thus, it is possible to suppress interference with the head 73a and getting caught on the head 73a.

By co-fastening the main frame 22, the pivot frame 23, and the seat frame 24 as described above, reduction in the number of fastening members such as bolts and decrease in the number of assembling steps can be intended. Furthermore, reduction in the weight of the vehicle body frame 11 (see FIG. 3) can also be intended.

FIGS. 7A and 7B illustrate operational diagrams for comparing operations according to the positions of the torsional centers 76 and 100 of the vehicle body frame.

FIG. 7A is an operational, diagram illustrating the operation of the vehicle body frame having the torsional center 100 of a comparative example. FIG. 7B is an operational diagram illustrating the operation of the vehicle body frame 11 having the torsional center 76 of a working example (present embodiment). In FIGS. 7A and 7B, each left diagram illustrates the state before an external force acts and each right diagram illustrates the state in which the external force is acting.

As illustrated in FIG. 7A, in the left diagram, the distance from the center of a head pipe 101 in the longitudinal direction to the torsional center 100 is defined as L1. The distance L1 is shorter than a distance L (see FIG. 7B) of the working example. Thus, the torsional center 100 is high and a distance L2 between the torsional center 100 and a ground-contact point C1 of the front wheel 12 (see FIG. 1) is long.

When an external force F horizontally acts on the ground-contact point C1 of the front wheel 12, the ground-contact point C1 moves to a ground-contact point C2 in the right diagram. The movement distance from the ground-contact, point C1 to the ground-contact point C2 at this time is M1. The direction of the external force F is the vehicle width direction (the same hereinafter).

As illustrated in FIG. 7B, in the left diagram, the distance from the center 21c of the head pipe 21 to the torsional center 76 is L. The distance L is longer than the distance L1 (see FIG. 7A) of the comparative example. Therefore, the torsional center 76 is low and a distance L3 between the torsional center 76 and the ground-contact point C1 is shorter than the distance L2 (see FIG. 7A).

When an external force F horizontally acts on the ground-contact point C1 of the front wheel 12, the ground-contact point C1 moves to a ground-contact point C3 in the right diagram. The movement distance from the ground-contact point C1 to the ground-contact point C3 at this time is M2.

In FIGS. 7A and 7B, in the comparative example, because the distance L2 is long, the moment around the torsional center 100 is large and the movement distance L1 is long.

In contrast, in the working example, because the distance L3 is short, the moment around the torsional center 76 is small and the movement distance M2 is shorter than the movement distance M1.

That is, in the working example, the behavior of the front fork 30 (see FIG. 1), which is the steering system, is suppressed against the external disturbance that acts on the front wheel 12 compared with the comparative example, and the steering stability of the vehicle can be improved.

As illustrated in the above FIG. 1 to FIG. 3, the vehicle body frame structure of the motorcycle 10 as a saddle riding vehicle includes the main frame 22 that extends from the head pipe 21 toward the vehicle rear side above the engine 41 and the down-frame 26 that extends downward from one end fixed to the head pipe 21. In the vehicle body frame structure, the main frame 22 is assembled into a truss shape from the pairs of left and right upper frames 31 and lower frames 32 and the reinforcing frames 33, 34, 35, and 36 disposed between these upper frames 31 and lower frames 32.

The front ends of the upper frames 31 are fixed to the upper end side of the head pipe 21 and the front ends of the lower frames 32 are fixed to a part close to the head pipe 21 in the single down-frame 26.

Due to the connecting of the single down-frame 26 with low rigidity to the head pipe 21 and the truss-shaped main frame 22 with high rigidity, the torsional center 76 of the vehicle body frame 11 when a torsional load is transmitted from the front wheel 12 to the head pipe 21 and the vehicle body frame 11 is twisted can be lowered. This can improve the steering stability of the vehicle. Furthermore, the volume of the vehicle body frame 11 can be reduced due to the truss-shaped main frame 22 and the single down-frame 26, so that reduction in the weight of the vehicle body frame 11 can be intended.

Furthermore, as illustrated in FIG. 2 and FIG. 3, the vehicle body frame structure includes the sub-frame 27 that couples the down-frame 26 and the lower frame 32 and the sub-frame 27 is made to abut against the reinforcing frame 34 with the intermediary of the lower frame 32.

Due to the abutting of the sub-frame 27 against the reinforcing frame 34 with the intermediary of the lower frame 32, the vehicle body frame 11 can be given high rigidity, and the rigidity of the vehicle body frame 11 can be effectively increased. Furthermore, in the case of coupling the main frame 22 with high rigidity and the down-frame 26 with low rigidity, local difference in the rigidity can be suppressed due to the abutting between the reinforcing frame 34 and the sub-frame 27. This can cause the vehicle body frame 11 to effectively warp and obtain favorable rigidity balance of the whole of the vehicle body frame 11.

Moreover, as illustrated in FIG. 3 and FIG. 5, the interval between the upper frame 31 and the lower frame 32 is long on the side of the head pipe 21 and becomes shorter as going toward the vehicle rear side.

According to this configuration, the rigidity and strength of the front side of the main frame 22 in which torsion occurs can be enhanced. Because the front fork 30 (see FIG. 1), which is the steering system, is disposed on the front end side of the main frame 22, the steering stability of the vehicle can be improved by enhancing the rigidity and strength of the front side of the main frame 22.

Furthermore, as illustrated in FIG. 2 and FIG. 3, the sub-frame 27 and the reinforcing frames 33, 34, 35, and 36 are smaller than the upper frames 31 and the lower frames 32 in the outer diameter.

According to this configuration, adjustment of the rigidity of the vehicle body frame 11 can be facilitated due to the coupling of the upper frames 31 and the lower frames 32 with high rigidity and the sub-frame 27 and the reinforcing frames 33, 34, 35, and 36 with low rigidity. This can obtain favorable rigidity balance of the whole of the vehicle body frame 11 and cause the vehicle body frame 11 to effectively warp. In addition, ensuring of the strength and reduction in the weight regarding the vehicle body frame 11 can be intended by the upper frames 31 and the lower frames 32 with a large outer diameter and the sub-frame 27 and the reinforcing frames 33, 34, 35, and 36 with a small outer diameter.

Moreover, the plural reinforcing frames 33, 34, 35, and 36 are disposed. Of the plural reinforcing frames 33, 34, 35, and 36, the reinforcing frame 34 made to abut against the sub-frame 27 with the intermediary of the lower frame 32 is larger than the other reinforcing frames 33, 35, and 36 in the outer diameter.

According to this configuration, the strength-and-rigidity balance of the vehicle body frame 11 is adjusted by the reinforcing frame 34 with high rigidity and the other reinforcing frames 33, 35, and 36 with low rigidity, so that the favorable strength-and-rigidity balance of the vehicle body frame 11 can be obtained while reduction in the weight of the vehicle body frame 11 is intended.

The above-described embodiment merely illustrates one aspect of the present invention and modification and application can be arbitrarily implemented without departing from the gist of the present invention.

For example, in the above-described embodiment, as illustrated in FIG. 2 and FIG. 3, the rear ends of the upper frames 31 and the lower frames 32 are connected to each other with the intermediary of the rear end connecting member 28. However, the structure is not limited thereto, and the rear ends of the upper frames 31 and the lower frames 32 may be directly connected to each other.

The present invention is not limited to the case of being applied to the motorcycle 10 and can be applied also to saddle riding vehicles including also vehicles other than the motorcycle. The saddle riding vehicles include overall vehicles ridden with the vehicle body straddled.

DESCRIPTION OF REFERENCE NUMERALS

10 Motorcycle (saddle riding vehicle)
11 Vehicle body frame
21 Head pipe
22 Main frame
26 Down-frame
27 Sub-frame
31 Upper frame
32 Lower frame
33, 34, 35, 36 Reinforcing frame
41 Engine

The invention claimed is:

1. A vehicle body frame structure of a saddle riding vehicle comprising:
a main frame that extends from a head pipe toward a vehicle rear side above an engine and
a single down-frame that extends downward from one end, which is fixed to the head pipe,
the main frame being assembled into a truss shape from left and right upper frames, left and right lower frames, and reinforcing frames, the reinforcing frames being disposed between the right upper frame and the right lower frame and between the left upper frame and the left lower frame, wherein
front ends of the left and right upper frames are fixed to an upper end side of the head pipe and front ends of the left and right lower frames are separated from the head pipe and fixed to the single down-frame at a position that is at an upper part of the single down-frame and that is at a rear side of a lower end of the head pipe, the upper part of the single down-frame being close to the head pipe.

2. The vehicle body frame structure of a saddle riding vehicle according to claim 1, wherein
the vehicle body frame structure includes sub-frames, each of said sub-frames couples the single down-frame to a corresponding one of the left and right lower frames, and each of the sub-frames is made to abut against one of the reinforcing frames with an intermediary of the corresponding one of the left and right lower frames.

3. The vehicle body frame structure of a saddle riding vehicle according to claim 2, wherein
outer diameters of the sub-frames and the reinforcing frames are smaller than outer diameters of the upper frames and the lower frames.

4. The vehicle body frame structure of a saddle riding vehicle according to claim 3, wherein
a plurality of the reinforcing frames are secured to each of the lower frames and the plurality of the reinforcing frames including first and second reinforcing frames, wherein the first reinforcing frame is made to abut against the one of the sub-frames with the intermediary of the corresponding one of the left and right lower frames and wherein an outer diameter of the first reinforcing frame is larger than an outer diameter of the second reinforcing frame.

5. The vehicle body frame structure of a saddle riding vehicle according to claim 2, wherein
a plurality of the reinforcing frames are secured to each of the lower frames and, the plurality of the reinforcing frames include first and second reinforcing frames, wherein the first reinforcing frame is made to abut against one of said left and right sub-frames with the intermediary of the corresponding one of the left and right lower frames and wherein an outer diameter of the first reinforcing frame is larger than an outer diameter of the second reinforcing frame.

6. The vehicle body frame structure of a saddle riding vehicle according to claim 5, wherein for each of the left and right lower frames:
the second reinforcing frame is disposed at a front side of a corresponding first reinforcing frame, and
the second reinforcing frame includes an upper end and a lower end, a distance between the lower end of the second reinforcing frame and the corresponding first reinforcing frame is smaller than a distance between the upper end of the second reinforcing frame and the corresponding first reinforcing frame,
an upper end part of the sub-frame faces toward a lower end part of the corresponding first reinforcing frame through the corresponding lower frame,
a lower end part of the sub-frame is connected to an intermediate portion of the single down frame.

7. The vehicle body frame structure of a saddle riding vehicle according to claim 6, wherein the upper end part of the sub-frame is located rearwardly of the lower end part of the sub-frame.

8. The vehicle body frame structure of a saddle riding vehicle according to claim 2, wherein
a space between the left upper frame and the let lower frame and between the right upper frame and the right lower frame decreases as the upper and lower frames extend from the head pipe toward the vehicle rear side.

9. The vehicle body frame structure of a saddle riding vehicle according to claim 1, wherein
a space between the left upper frame and the let lower frame and between the right upper frame and the right lower frame decreases as the upper and lower frames extend from the head pipe toward the vehicle rear side.

10. The vehicle body frame structure of a saddle riding vehicle according to claim 9, wherein
the vehicle body frame structure includes sub-frames each of which couples the single down-frame to a corresponding one of the left and right lower frames, and each of the sub-frames is made to abut against an associated reinforcing frame with an intermediary of the corresponding one of the left and right lower frames,
a plurality of the reinforcing frames are secured to each of the lower frames and, the plurality of the reinforcing frames include first and second reinforcing frames, wherein the first reinforcing frame is made to abut against one of the sub-frames with the intermediary of the corresponding one of the left and right lower frames and wherein an outer diameter of the first reinforcing frame is larger than an outer diameter of the second reinforcing frame.

* * * * *